US008315765B2

(12) United States Patent
Gerdes et al.

(10) Patent No.: US 8,315,765 B2
(45) Date of Patent: Nov. 20, 2012

(54) METHOD FOR REDUCING THE ROLLOVER RISK IN VEHICLES

(75) Inventors: Manfred Gerdes, Vaihingen/Enz (DE);
Frank Niewels, Ludwigsburg (DE);
Sylvia Futterer, Ludwigsburg (DE);
Peter Ziegler, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 1089 days.

(21) Appl. No.: 12/236,906

(22) Filed: Sep. 24, 2008

(65) Prior Publication Data

US 2009/0082923 A1    Mar. 26, 2009

(30) Foreign Application Priority Data

Sep. 24, 2007  (DE) .................. 10 2007 045 572

(51) Int. Cl.
| A01B 69/00 | (2006.01) |
| G05D 1/00 | (2006.01) |
| B60G 17/016 | (2006.01) |
| B60G 17/005 | (2006.01) |
| B60G 17/015 | (2006.01) |
| G06F 7/70 | (2006.01) |
| B60Q 1/00 | (2006.01) |
| B60T 7/16 | (2006.01) |
| B60K 28/16 | (2006.01) |
| B60R 21/00 | (2006.01) |

(52) U.S. Cl. ............... 701/41; 701/1; 701/38; 701/70; 701/72; 340/429; 340/438; 340/440; 340/465; 180/6.48; 180/168; 180/197; 180/406; 180/446; 280/5.502; 280/5.51; 280/755

(58) Field of Classification Search ............... 701/1, 29, 701/36–42, 45, 48, 70, 72; 340/429, 438, 340/440, 441, 446, 465; 180/6.48, 168, 197, 180/271, 282, 406, 411, 422, 446; 280/5.502, 280/5.507, 5.51, 728.1, 730.2, 735, 743.1, 280/755

See application file for complete search history.

(56) References Cited

U.S. PATENT DOCUMENTS

| 6,178,368 B1 * | 1/2001 | Otake | 701/70 |
| 6,226,581 B1 * | 5/2001 | Reimann et al. | 701/48 |
| 6,311,111 B1 * | 10/2001 | Leimbach et al. | 701/38 |
| 6,321,141 B1 * | 11/2001 | Leimbach | 701/1 |
| 6,339,739 B1 * | 1/2002 | Folke et al. | 701/70 |
| 6,374,171 B2 * | 4/2002 | Weiberle et al. | 701/71 |
| 6,384,719 B1 * | 5/2002 | Dieckmann | 340/440 |
| 6,463,379 B1 * | 10/2002 | Kohler et al. | 701/84 |
| 6,564,132 B2 * | 5/2003 | Hackenberg | 701/45 |
| 6,823,244 B2 * | 11/2004 | Breed | 701/29 |
| 7,008,026 B2 * | 3/2006 | Baumgarten | 303/146 |
| 7,149,614 B2 * | 12/2006 | Traechtler et al. | 701/38 |
| 2007/0282510 A1 * | 12/2007 | Nimmo et al. | 701/70 |

FOREIGN PATENT DOCUMENTS

| DE | 199 18 597 | 11/2000 |
| EP | 1 118 507 | 7/2001 |
| JP | 2003-127889 | 5/2003 |
| JP | 2004-306944 | 11/2004 |
| WO | WO 2007/024591 | 3/2007 |

* cited by examiner

*Primary Examiner* — James Trammell
*Assistant Examiner* — Majdi Alsomiri
(74) *Attorney, Agent, or Firm* — Kenyon & Kenyon LLP

(57) ABSTRACT

In a method for reducing the rollover risk in vehicles, at least one state variable which characterizes the transverse dynamics of the vehicle is ascertained and is used as the basis for an intervention into the steering system and the braking system which stabilizes the vehicle. A multivariable control is carried out in which two control loops are superimposed, the first control loop being based on control of the yaw rate and the second control loop being based on control of the transverse acceleration. The steering system as well as the braking system may be adjusted via the first and second control loops.

14 Claims, 2 Drawing Sheets

METHOD FOR REDUCING THE ROLLOVER RISK IN VEHICLES

CROSS-REFERENCE TO RELATED APPLICATIONS

The present application claims priority to Application No. 10 2007 045 572.2, filed in the Federal Republic of Germany on Sep. 24, 2007, which is expressly incorporated herein in its entirety by reference thereto.

FIELD OF THE INVENTION

The present invention relates to a method for reducing the rollover risk in vehicles.

BACKGROUND INFORMATION

A method of this type is described in DE 199 18 597, in which a rollover coefficient which represents the rollover risk is continuously computed, the rollover coefficient being based on the ratio of the height of the center of gravity to the track width of the vehicle. The transverse acceleration and the roll angle are used in the computation of the rollover coefficient. A steering intervention is automatically carried out to stabilize the vehicle if the instantaneous rollover coefficient exceeds a threshold value. In addition, brake pressure control may be activated if a critical value is exceeded, so that active intervention into the longitudinal dynamics of the motor vehicle is also carried out as a result of activating the brakes. However, DE 199 18 597 contains no information concerning the manner in which the braking operation is carried out simultaneously with a steering intervention.

SUMMARY

Example embodiments of the present invention provide a method for reducing the rollover risk in vehicles which may be carried out using simple measures, and via which improved vehicle stabilization may be achieved. An aim is to achieve higher transverse acceleration values without jeopardizing the stability of the vehicle.

In the method for reducing the rollover risk in vehicles, at least one state variable which characterizes the transverse dynamics of the vehicle is ascertained, and is used as the basis for an intervention into the steering system and the braking system, which stabilizes the vehicle. The intervention for stabilizing the vehicle is carried out using multivariable control, in which two control loops are superimposed. The first control loop is based on control of the yaw rate or of a state variable which corresponds to the yaw rate, and the second control loop is based on control of the transverse acceleration or of a state variable which corresponds to the transverse acceleration. Example embodiments of the present invention further provide that in principle, the steering system as well as the braking system may be adjusted via the first and second control loops.

The interventions carried out using this method result in the best possible driving safety with optimized driving comfort and minimum impairment of the driving response. Since the yaw rate as well as the transverse acceleration are used as the basis in the two superimposed control loops, oscillation of the control loops, which tends toward instability, is avoided. The transverse acceleration control response is stabilized in any driving state by use of the multivariable control, using the variables of yaw rate and transverse acceleration on an equal basis. Since as a result of the provided control the vehicle avoids extreme slip angles, for which the lateral forces on the tires are greatly reduced, higher transverse acceleration values may be achieved without jeopardizing the stability of the vehicle.

In particular, excessive steering angles due to inadvertent oversteering by the driver may be neutralized or at least reduced by the interventions into the steering system and the braking system, it being possible to implement as an intended function both optimum driving safety and optimum driving comfort, accompanied by minimal interventions in the vehicle response. If an active steering system is present with the possibility of specifying a superimposed steering angle, steering interventions into the active steering system may be carried out using multivariable control, optionally supported by additional stabilizing braking interventions. The active steering system may be designed as a front axle steering system and/or as a rear axle steering system.

Since the braking interventions have a greater influence on driving comfort, it may be advantageous to improve vehicle stability primarily via steering interventions, and to carry out the braking interventions in only an auxiliary manner in the event that sufficient stabilization cannot be achieved via the steering alone. In this manner a hierarchy in the action on the steering and braking systems is established in such a way that while the method is being carried out the steering system is acted on continuously and the braking system is acted on only as needed, the decision to act on the braking system being made in particular based on a criterion which characterizes the stability of the vehicle, for example the slip angle. The braking system is acted on if necessary for stability reasons, but otherwise remains uninfluenced.

The division of the control system into a first control loop relating to the yaw rate and a second control loop relating to the transverse acceleration has the further advantage that an additional significant increase in stability may be achieved using the yaw rate control loop due to the more rapid intervention. Furthermore, there are additional degrees of freedom, so that not only may the driving stability be improved, but also the responsiveness of the vehicle may be increased when the controllers are correspondingly parameterized. The driving response may be adapted to various requirements for driving safety, driving comfort, and driving responsiveness.

In principle, the method may be applied to vehicles having any type of steering system. An actively adjustable steering system with the possibility of specifying a superimposed steering angle allows steering interventions which have a particularly strong influence on the stability of the vehicle. In principle, however, for the method it is also possible to use, for example, a steering system designed as an electric power steering (BPS) which does not provide a superimposed steering angle. In this case, the degree of the torque assistance is influenced, thereby increasing or reducing the steering torque provided by the driver.

Because the intervention for preventing a rollover of the vehicle is assigned highest priority, during the action on the steering system and optionally also the braking system, other interventions by additional control systems which are implemented in the vehicle and which likewise act on the steering system, the braking system, and/or other active control units in the vehicle are suppressed to avoid an adverse influence on the stabilization process. In the case of an active steering system, the parameterization of the variable steering ratio is "frozen" during the stabilization intervention. For active steering systems, at the start of the stabilization method the superimposed steering angles, which are currently specified by other steering systems, are reset to neutral values, and only superimposed steering angles are permitted which result from carrying out the method.

After the method has been terminated, the interventions by other control systems may once again be permitted.

In an example embodiment, the two control loops for the multivariable control are based on a common setpoint reference quantity. This is a transverse acceleration threshold value which is specified as a setpoint value for the control loop relating to the transverse acceleration and from which a corresponding yaw rate setpoint value is ascertained using a kinematic relationship. The yaw rate setpoint value is obtained, for example, by dividing the yaw acceleration threshold value by the vehicle velocity. The transverse acceleration threshold value is assumed to be that for stable, steady-state driving on a circular track, for example. This procedure avoids surges in each control loop and therefore improves the stability.

According to a further exemplary embodiment, the sensor-determined state variables of an electronic stability program (ESP) implemented in the vehicle are used. The actual yaw rate and the actual transverse acceleration in particular are taken into consideration. The data available in the ESP may be used as the basis for the initial condition in which a query is made as to whether there is a risk of the vehicle rolling over, which is a prerequisite for initiating the method. The need for additional hardware components is thus avoided, it being sufficient to use existing hardware components installed in the vehicle.

If an active chassis system having an adjustable actuator is present in the vehicle, this system may also be used for carrying out the method.

Further features and aspects of example embodiments of the present invention are described in more detail below with reference to the appended Figures.

DETAILED DESCRIPTION

Figure 1:
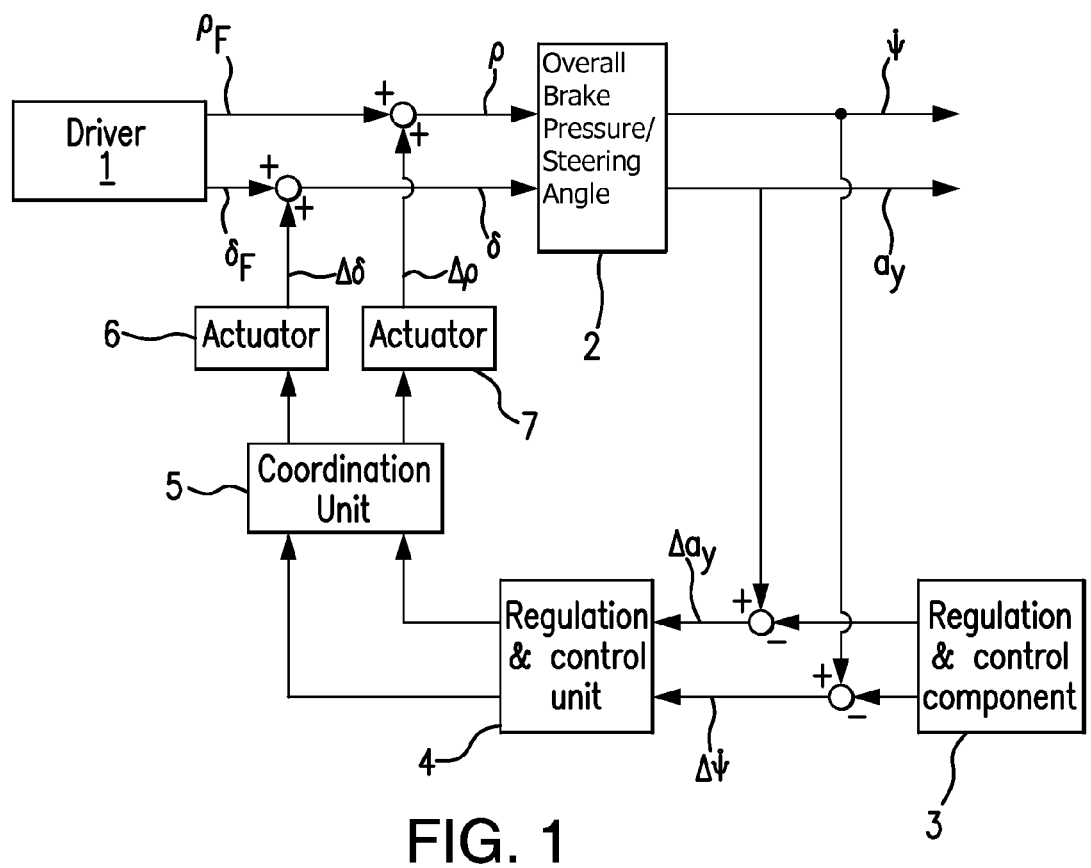
FIG. 1 shows a block diagram for carrying out the method, illustrating the controller architecture.

FIG. 1 illustrates the controller architecture for carrying out the method for multicircuit control, having a first control loop which influences the yaw rate and a second control loop which influences the transverse acceleration. Block 1 represents the driver, who specifies a steering angle $\delta_F$ and a brake pressure $p_F$. The specifications by the driver are in each case superimposed by superimposition values $\Delta\delta$ for the steering angle and $\Delta p$ for the brake pressure, resulting in an overall steering angle $\delta$ and an overall brake pressure p which are in effect in the vehicle represented by block 2. A prerequisite is an actively adjustable steering system which permits generation of a superimposed steering angle. If such a system is not provided in the vehicle, instead of a superimposed steering angle the steering torque may also be influenced by the control system.

After the actuators in the steering system and in the braking system, and optionally an actuator to be associated with an active chassis system, have been activated, the instantaneous values of yaw rate $\dot{\psi}$ and transverse acceleration $a_y$ are available to other control loops. In the present multivariable control for reducing the rollover risk of the vehicle, these actual values are also returned in a closed circuit. To this end, set-point values which are ascertained in a block 3, which is a component of the regulation and control unit in which the method runs, are subtracted from the instantaneous values of yaw rate $\dot{\psi}$ and transverse acceleration $a_y$ which are available at the output of block 2. Obtained as results are control deviations $\Delta\dot{\psi}$ for the yaw rate and $\Delta a_y$ for the transverse acceleration, which are sent to a controller 4 which likewise is a component of the regulation and control unit. Actuating signals are generated via controller 4 and a block 5 downstream from the controller which is used as a coordination unit, and the actuating signals are sent to actuators 6 and 7 for the steering system and the braking system, respectively, and optionally to an actuator for the active chassis system. Superimposition values $\Delta\delta$ and $\Delta p$ are generated in these actuators and, as described above, are superimposed on values $\delta_F$ and $\delta_p$ specified by the driver.

Figure 2:
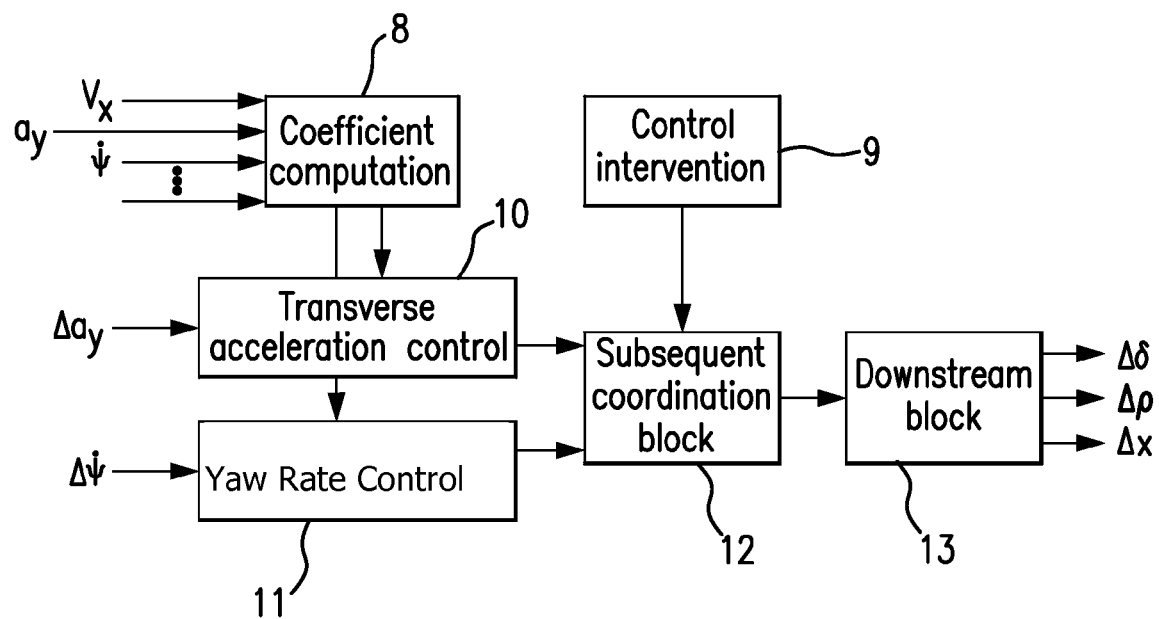
FIG. 2 shows a block diagram illustrating the control algorithm.

FIG. 2 illustrates the control algorithm for carrying out the multivariable control. In a block 8 a coefficient computation is carried out as a function of supplied actual values for vehicle velocity $v_x$, transverse acceleration $a_y$, yaw rate $\dot{\psi}$, and optionally other vehicle state variables. These coefficients are then transmitted to the control algorithms for the transverse acceleration control (block 10) and the yaw rate control (block 11), in which the adjustment variables are ascertained, taking into consideration control deviations $\Delta a_y$ and $\Delta\dot{\psi}$, and the adjustment variables are sent to subsequent coordination block 12 for distributing the control interventions to the steering system and the braking system. Via block 9, this coordination block 12 is also supplied with the instantaneous specifications by the driver.

On the output side, the signals from coordination block 12 are first converted in a downstream block 13, and then in the form of superimposition values $\Delta\delta$ and $\Delta p$ are sent to the steering system or the braking system. As an example, an additional superimposition value $\Delta x$, which, for example, is to be sent to an active chassis system, is present at the output of block 13.

Figure 3:
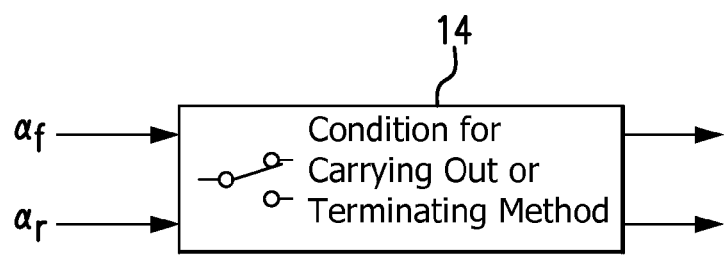
FIG. 3 shows a further block diagram illustrating the condition for carrying out and terminating the method for reducing the rollover risk.

FIG. 3 illustrates a simple block diagram having a block 14 which represents the condition for carrying out and terminating the method. As a function of slip angle $\alpha_f$ at the wheels on the front axle and $\alpha_r$ at the wheels on the rear axle, a decision is made as to whether the vehicle is in a stable state, an unstable state, or a state approximating the unstable state. Depending on the magnitude of slip angle $\alpha_f$, $\alpha_r$, the method for the stabilizing multivariable control is either resumed or terminated. The conditions may also be formulated in such a way that various systems in the vehicle may be activated or remain uninfluenced in a hierarchical manner; for example, when there is increased rollover risk, initially only the steering system is acted on, and the braking system is additionally acted on only if the rollover risk further increases.

What is claimed is:

1. A method for reducing a rollover risk in a vehicle, comprising:
   ascertaining at least one state variable which characterizes transverse dynamics of the vehicle;
   performing an intervention, based on the at least one state variable, into a steering system and a braking system which stabilizes the vehicle;
   performing a multivariable control, for stabilizing the vehicle, in which two control loops are superimposed, a yaw rate control loop being based on control of at least one of (a) a yaw rate and (b) a corresponding state variable, and a transverse acceleration control loop being based on control of at least one of (a) a transverse acceleration and (b) a corresponding state variable; and adjusting the steering system and the braking system via the two control loops, wherein the two control loops are based on a common setpoint reference value, wherein a transverse acceleration threshold value is specified as a setpoint value for the transverse acceleration control loop, and the transverse acceleration setpoint value is used to ascertain a yaw rate setpoint value for the yaw rate control loop, wherein sensor-determined state variables of an electronic stability program implemented in the vehicle are used, wherein the sensor-determined state variables include the yaw rate and the transverse acceleration, and wherein data available in an electronic stability program is used to make a query as to whether there is a risk of the vehicle rolling over.

2. The method according to claim 1, wherein while the method is being carried out, the steering system is acted on permanently and the braking system is acted on as needed.

3. The method according to claim 2, wherein on the basis of a criterion which characterizes the stability of the vehicle, a decision is made as to whether the braking system is acted on or remains uninfluenced.

4. The method according to claim 3, wherein the criterion includes a slip angle.

5. The method according to claim 1, wherein a chassis actuator is acted on as needed.

6. The method according to claim 1, wherein an actively adjustable steering system is acted on, via which an additional steering angle, which is superimposed on the steering angle specified by a driver, is settable.

7. The method according to claim 6, wherein during the action on the steering system, additional interventions by other control systems into the steering system are suppressed.

8. The method according to claim 1, wherein an electrically actuatable steering system is acted on, via which an assisting steering torque is generatable.

9. A regulation and control unit, comprising:
an arrangement configured to perform a method for reducing a rollover risk in a vehicle, the arrangement including:
(a) an arrangement configured to ascertain at least one state variable which characterizes transverse dynamics of the vehicle;
(b) an arrangement configured to perform an intervention, based on the at least one state variable, into a steering system and a braking system which stabilizes the vehicle;
(c) an arrangement configured to perform a multivariable control, for stabilizing the vehicle, in which two control loops are superimposed, a yaw rate control loop being based on control of at least one of (a) a yaw rate and (b) a corresponding state variable, and a transverse acceleration control loop being based on control of at least one of (a) a transverse acceleration and (b) a corresponding state variable; and
(d) an arrangement configured to adjust the steering system and the braking system via the two control loops, wherein the two control loops are based on a common setpoint reference value, wherein a transverse acceleration threshold value is specified as a setpoint value for the transverse acceleration control loop, and the transverse acceleration setpoint value is used to ascertain a yaw rate setpoint value for the yaw rate control loop, wherein sensor-determined state variables of an electronic stability program implemented in the vehicle are used, wherein the sensor-determined state variables include the yaw rate and the transverse acceleration, and wherein data available in an electronic stability program is used to make a query as to whether there is a risk of the vehicle rolling over.

10. A vehicle, comprising:
a regulation and control unit;
a steering system; and
a braking system;
wherein the regulation and control unit includes an arrangement configured to perform a method for reducing a rollover risk in the vehicle, the arrangement including:
(a) an arrangement configured to ascertain at least one state variable which characterizes transverse dynamics of the vehicle;
(b) an arrangement configured to perform an intervention, based on the at least one state variable, into the steering system and the braking system which stabilizes the vehicle;
(c) an arrangement configured to perform a multivariable control, for stabilizing the vehicle, in which two control loops are superimposed, a yaw rate control loop being based on control of at least one of (a) a yaw rate and (b) a corresponding state variable, and a transverse acceleration control loop being based on control of at least one of (a) a transverse acceleration and (b) a corresponding state variable; and
(d) an arrangement configured to adjust the steering system and the braking system via the two control loops, wherein the two control loops are based on a common setpoint reference value, wherein a transverse acceleration threshold value is specified as a setpoint value for the transverse acceleration control loop, and the transverse acceleration setpoint value is used to ascertain a yaw rate setpoint value for the yaw rate control loop, wherein sensor-determined state variables of an electronic stability program implemented in the vehicle are used, wherein the sensor-determined state variables include the yaw rate and the transverse acceleration, and wherein data available in an electronic stability program is used to make a query as to whether there is a risk of the vehicle rolling over.

11. The vehicle according to claim 10, further comprising: an actively adjustable chassis system.

12. The method according to claim 1 wherein while the method is being carried out, the steering system is acted on permanently and the braking system is acted on as needed, wherein on the basis of a criterion which characterizes the stability of the vehicle, a decision is made as to whether the braking system is acted on or remains uninfluenced, and wherein the criterion includes a slip angle.

13. The method according to claim 1 wherein a chassis actuator is acted on as needed, wherein an actively adjustable steering system is acted on, via which an additional steering angle, which is superimposed on the steering angle specified by a driver, is settable, and wherein during the action on the steering system, additional interventions by other control systems into the steering system are suppressed.

14. The method according to claim 1 wherein an electrically actuatable steering system is acted on, via which an assisting steering torque is generatable.

* * * * *